US 6,631,977 B2

(12) United States Patent
Andrews

(10) Patent No.: US 6,631,977 B2
(45) Date of Patent: Oct. 14, 2003

(54) LASER ABLATABLE HYDROPHOBIC FLUORINE-CONTAINING GRAFT COPOLYMERS

(75) Inventor: John R. Andrews, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 59 days.

(21) Appl. No.: 09/911,795

(22) Filed: Jul. 25, 2001

(65) Prior Publication Data

US 2003/0020785 A1 Jan. 30, 2003

(51) Int. Cl.[7] .................. B23K 26/00; B32B 27/28; B41J 2/135; B41J 2/16
(52) U.S. Cl. ................... 347/44; 347/45; 347/63; 219/121.7; 219/121.71; 264/400; 428/131; 428/137; 428/421; 428/500; 526/247; 526/250; 526/254
(58) Field of Search ................... 347/20, 44, 45, 347/63; 428/131, 137, 421, 422, 500; 264/400; 219/121.7, 121.71; 526/247, 250, 254

(56) References Cited

U.S. PATENT DOCUMENTS

| 4,915,981 A | 4/1990 | Traskos et al. ............ 427/53.1 |
|---|---|---|
| 5,169,678 A | 12/1992 | Cole et al. .................. 427/555 |
| 5,212,496 A | 5/1993 | Badesha et al. .............. 347/45 |
| 5,218,381 A | 6/1993 | Narang et al. ............... 347/45 |
| 5,291,226 A | 3/1994 | Schantz et al. ............... 347/63 |
| 5,502,470 A * | 3/1996 | Miyashita et al. ............ 347/45 |
| 2001/0017639 A1 * | 8/2001 | Noguchi et al. .............. 347/45 |

* cited by examiner

Primary Examiner—Ramsey Zacharia
(74) Attorney, Agent, or Firm—Oliff & Berridge, PLC

(57) ABSTRACT

A method of making a laser ablated article includes forming an article of one or more layers, each of which absorbs radiation within the wavelength range of from about 210 nm to about 360 nm and at least one of which is a hydrophobic fluorine-containing graft copolymer derived from at least one fluorine-containing monomer and at least one comonomer containing at least one aromatic group, and processing the article with a laser that outputs radiation at a wavelength of between about 210 nm and about 360 nm. The graft copolymer is surprisingly absorptive to radiation within the specified wavelength range. Articles formed using laser ablation include a nozzle plate of an ink jet printhead, wherein the nozzle plate contains ink jet openings formed by laser ablation and has a polymer substrate coated with the laser ablatable hydrophobic fluorine-containing graft copolymer.

17 Claims, No Drawings

LASER ABLATABLE HYDROPHOBIC FLUORINE-CONTAINING GRAFT COPOLYMERS

BACKGROUND OF THE INVENTION

1. Field of Invention

This invention relates to laser ablatable hydrophobic fluorine-containing graft copolymers, and more in particular to articles such as ink jet printheads that are coated with a hydrophobic fluorine-containing graft copolymer that is laser ablatable. The invention also relates to methods of making fluorine-containing polymers laser ablatable within a desired wavelength range, and to a method of making a laser ablated article that includes the fluorine-containing article of this invention.

2. Description of Related Art

Laser ablated nozzle plates of ink jet nozzles are known to provide excellent drop ejector performance. One example of an ink jet nozzle in which the openings therein are formed with a laser can be seen in U.S. Pat. No. 5,291,226, incorporated herein by reference in its entirety. This patent describes an inkjet printhead that includes a nozzle member formed of a polymer material that has been laser-ablated to form inkjet orifices, ink channels, and vaporization chambers in the unitary nozzle member. The nozzle member is then mounted to a substrate containing heating elements associated with each orifice. In a preferred method, the orifices, ink channels, and vaporization chambers are formed using an excimer laser.

In ink jet printing, a printhead is provided, the printhead having at least one ink-filled channel for communication with an ink supply chamber at one end of the ink-filled channel. An opposite end of the ink-filled channel has a nozzle opening from which droplets of ink are ejected onto a recording medium. In accordance with the ink droplet ejection, the printhead forms an image on the recording medium. The ink droplets are formed as ink forms a meniscus at each nozzle opening prior to being ejected from the printhead. After a droplet is ejected, additional ink surges to the nozzle opening to reform the meniscus.

The direction of the ink jet determines the accuracy of placement of the droplet on the receptor medium, which, in turn, determines the quality of printing performed by the printer. Accordingly, precise jet directionality is an important property of a high quality printhead. Precise jet directionality ensures that ink droplets will be placed precisely where desired on the printed document. Poor jet directionality results in the generation of deformed characters and visually objectionable banding in half tone pictorial images. Particularly with the newer generation of thermal ink jet printers having higher resolution enabling printing at at least 360 dots per inch, improved print quality is demanded by customers.

A major source of ink jet misdirection is associated with improper wetting of the front face of the printhead containing at least one nozzle opening. One factor which adversely affects jet directional accuracy is the accumulation of dirt and debris, including paper fibers, on the front face of the printhead. Another factor which adversely affects jet directional accuracy is the interaction of ink previously accumulated on the front face of the printhead with the exiting droplets. This accumulation is a direct consequence of the forces of surface tension, the accumulation becoming progressively severe with aging due to chemical degradation (including, for example, oxidation, hydrolysis, reduction (of fluorine), etc.) of the front face of the printhead. Ink may accumulate on the printhead front face due to either overflow during the refill surge of ink or the splatter of small droplets resulting from the process of ejecting droplets from the printhead. When accumulated ink on the front face of the printhead makes contact with ink in the channel (and in particular with the ink meniscus at the nozzle orifice), the meniscus distorts, resulting in an imbalance of forces acting on the ejected droplet. This distortion leads to ink jet misdirection. This wetting phenomenon becomes more troublesome after extensive use of the printhead as the front face either chemically degrades or becomes covered with dried ink film. As a result, gradual deterioration of the generated image quality occurs.

One way of avoiding these problems is to control the wetting characteristics of the printhead front face so that no accumulation of ink occurs on the front face even after extensive printing. Thus, in order to provide accurate ink jet directionality, wetting of the front face of the printhead is preferably suppressed. This can be achieved by rendering the printhead front face hydrophobic.

For example, U.S. Pat. No. 5,218,381, incorporated herein by reference in its entirety, describes a coating comprising an epoxy adhesive resin such as EPON 1001F, for example, doped with a silicone rubber compound such as RTV 732. The coating can be provided in the form of a 24% solution of EPON 1001F and a 30:70 mixture of xylene and methyl iso-butyl ketone by weight doped with 1% by weight of RTV 732. Such a coating enables the directionality of an ink jet to be maintained for the printing lifetime of the printer. An adhesion promoter such as a silane component, for example, can also be included to provide a highly adherent, long lasting coating.

While laser ablated nozzle plates are able to provide excellent drop ejector performance as discussed above, a practical problem in so forming the nozzle plates is that while polymer materials used for the nozzle plate, for example polyimides, are laser ablatable with lasers such as excimer lasers, such polymers are not hydrophobic. It is thus necessary to provide a hydrophobic coating upon the surface of the nozzle plate to render the front face hydrophobic to improve the ink jet accuracy as discussed above.

It is difficult to apply a coating to a face of an ink jet nozzle plate after formation of the openings therein. While it is desirable to suppress the wetting property of the nozzle surface, it is also undesirable to allow any coating material to enter the channel of the nozzle. If the walls of the channel become coated with ink-repellent material, proper refill of the channel may be inhibited. Refill of each channel depends on surface tension and must be completed in time for the subsequent volley of droplets to be fired. If the refill process is not completed by the time the next droplet is fired, the meniscus may not be flush with the outer edge of the nozzle opening, resulting in misdirection. Further, an incompletely filled channel causes the ink droplet size to vary, which also leads to print quality degradation.

Providing the front face of nozzle plates with a hydrophobic coating prior to formation of the openings is also problematic when attempting to form the openings by laser ablation. Hydrophobic coating materials in general, and fluorine-containing polymers more specifically, are not laser ablatable, i.e., they are transparent to radiation at the wavelengths of 210–360 nm such as generated by excimer lasers and the third and fourth harmonics of NdYAG lasers.

U.S. Pat. No. 4,915,981 describes a method of ablating fluoropolymer composite materials wherein it was found that small holes (less than 100 μm) can be formed in fluoropolymer composite laminate materials using UV lasers of wavelengths between 190 nm and 400 nm. The resulting holes can be used to produce vias and plated through-holes having smooth side walls with little or no debris or residue remaining in the holes and minimal damage to the polymer. Thus, the vias and plated through-holes can be plated without further cleaning processes. The fluoropolymeric composite is at least one of the fluoropolymers selected from the group consisting of polytetrafluoroethylene (PTFE), a copolymer of TFE and perfluorovinyl ether (PFA), a copolymer of TFE and hexafluoropropylene (FEP) and a polychlorotrifluoroethylene (PCTFE) that contains a filler that absorbs within the specified UV range, for example a filler of at least one of microglass, silica, titanium dioxide, carbon fibers, microballoons and Kevlar.

U.S. Pat. No. 5,169,678 discloses that the ultraviolet absorption characteristics of a polymer material are modified by the addition of an ultraviolet absorbing dye to render it laser ablatable at a frequency at which the unmodified material is substantially non-laser ablatable, desirably at a wavelength of 351 nm. A method of making a high density interconnect structure using the polymer material is detailed. The ultraviolet absorbing dye may be of several specific types, including, e.g., p-phenylazophenol, N-p-methoxybenzylidene-p-phenylazoaniline, dihydroxyanthraquinone, beta carotene, etc. having an absorption band which includes the selected ultraviolet wavelength.

While hydrophobic polymer materials have been made to absorb ultraviolet radiation so as to be laser ablatable with light from an ultraviolet laser, use of an ultraviolet laser to form the openings of a nozzle face plate is not ideal. Such lasers tend to be less economical and more cumbersome to use compared to, e.g., excimer lasers. Such lasers operate deep in the ultraviolet light region, tend to form ozone from oxygen, and require more expensive optics.

What is still desired is an improved method of making laser ablatable articles such as nozzle face plates of ink jet printhead devices that contain a hydrophobic fluorine-containing polymer and which article is laser ablatable with a laser such as a KrF (krypton fluoride) or argon chloride (ArCl) excimer laser, or at the third or fourth harmonics of an NdYAG laser.

SUMMARY OF THE INVENTION

It is thus an object of the present invention to make a fluorine-containing polymer that is laser ablatable by an excimer laser, for example laser ablatable within the wavelength range of from about 210 to about 360 nm, i.e., the near ultraviolet wavelength region.

It is a still further object of the present invention to derive an article that is hydrophobic or coated with a hydrophobic coating and that is laser ablatable with an excimer laser such that the article can be processed with the excimer laser.

It is a still further object of the present invention to achieve an economical and efficient method of processing an article that is hydrophobic, or coated with a hydrophobic coating, using an excimer laser.

These and other objects are achieved by the present invention, which in embodiments relates to a method of making a laser ablated article, comprising forming an article of one or more layers, wherein each of the layers absorbs radiation (light) output from a laser at wavelengths within the range of from about 210 nm to about 360 nm, and wherein at least one of the layers comprises a hydrophobic fluorine-containing graft copolymer derived from at least one fluorine-containing monomer and at least one comonomer containing at least one aromatic group, and processing the article with a laser that outputs radiation at a wavelength of between about 210 nm and about 360 nm. The invention also relates to a laser ablated article comprising one or more layers, wherein each of the layers absorbs radiation output from a laser within the wavelength range of from about 210 nm to about 360 nm, and wherein at least one of the layers comprises a hydrophobic fluorine-containing graft copolymer derived from at least one fluorine-containing monomer and at least one comonomer containing at least one aromatic group.

The invention also relates to an ink jet printhead comprising a nozzle plate, wherein the nozzle plate contains ink jet openings and comprises a polymer substrate coated with a laser ablatable hydrophobic coating comprised of a hydrophobic fluorine-containing graft copolymer derived from at least one fluorine-containing monomer and at least one comonomer containing at least one aromatic group, and wherein the laser ablatable hydrophobic coating is laser ablatable within the wavelength range of from about 210 nm to about 360 nm.

DETAILED DESCRIPTION OF PREFERRED EMBODIMENTS

As discussed in the background section above, hydrophobic fluorine-containing polymers such as polytetrafluoroethylene (PTFE) are typically transparent to (do not absorb) radiation (light) of wavelengths in the range of from about 210 nm and about 360 nm, and thus are not laser ablatable within this range. It has now been found by the present inventor that these hydrophobic fluorine-containing polymers can be made to absorb radiation within these wavelengths so as to be laser ablatable by lasers outputting radiation at such wavelengths, and without adversely affecting the hydrophobic nature or other properties of the fluorine-containing polymer, by forming a graft copolymer of at least one fluorine-containing monomer and at least one comonomer containing at least one aromatic group.

By "at least one fluorine-containing monomer" herein is meant any monomer that contains one or more fluorine atoms and which can be formed into a hydrophobic fluoropolymer material. Suitable examples include, for example, tetrafluoroethylene (TFE), perfluoro(vinyl ether) and hexafluoropropylene. Most preferably, the fluorine-containing monomer is TFE.

By "at least one comonomer containing at least one aromatic group" is meant any comonomer that contains at least one phenyl group therein. Any comonomer material that introduces into the graft copolymer a component that absorbs at the wavelength of ablation (i.e., about 210 nm to about 360 nm) is suitable as the comonomer herein. It has been found that the presence of the aromatic group provided by the comonomer enables the fluorine-containing graft copolymer to absorb radiation within the wavelengths of about 210 nm to about 360 nm so as to be laser ablatable within these wavelengths without adverse affect upon properties of the fluorine-containing polymer.

Preferably, the at least one comonomer containing at least one aromatic group has a structure of

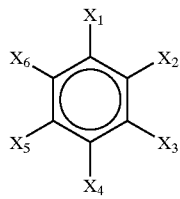

wherein each of $X_1$, $X_2$, $X_3$, $X_4$, $X_5$ and $X_6$ are the same or different and are selected from the group consisting of H, an alkyl group having from 1 to 20 carbon atoms and an aryl group having from 6 to 18 carbon atoms and wherein at least one of $X_1$, $X_2$, $X_3$, $X_4$, $X_5$ and $X_6$ is not H. Most preferred examples of suitable comonomers within this structure are styrene (i.e., phenyl ethylene) and 1-phenyl-2-propylene.

In forming the laser ablatable hydrophobic fluoro-graft copolymer of the present invention, it is necessary to use only a small amount of the comonomer. For example, the comonomer may be present in an amount of about 0.5% to about 20.0%, more preferably about 1.0% to about 10.0%, most preferably about 1.0% to about 5.0%, based on the weight of comonomer and fluorine-containing monomer. Use of small amounts of comonomer is also preferable in avoiding adverse affects upon the properties of the graft copolymer obtained.

The fluoro-graft copolymer of the invention may be formed in any suitable manner without restriction.

A further advantage of the present invention is that in forming laser ablatable covalently bonded graft copolymers, it is not necessary to add, e.g., dyes to render the material laser ablatable as has been done in the prior art such as discussed above. The use of non-covalently bonded dyes is problematic in that such dyes are leachable from the material over time, and therefor affect the long-term chemical stability of the material.

The fluoro-graft copolymer may also contain additional conventional additives as needed or desired, including fillers, flow additives, etc. as known in the art.

A most preferred hydrophobic laser ablatable graft copolymer of this invention is derived from the reaction of tetrafluoroethylene and styrene.

The hydrophobic graft copolymers of the invention are laser ablatable within the wavelength range of about 210 nm to about 360 nm. Preferred lasers for economy and efficiency to use in processing the graft copolymers with a laser are excimer lasers that operate within the aforementioned wavelength range. Most preferably, a krypton fluoride (KrF) excimer laser is used, which laser is known to operate at a wavelength of about 248 nm, although other excimer lasers such as argon chloride (ArCl) (about 308 nm) and xenon fluoride (XeF) (about 351 nm) may also be used, as can NdYAG lasers with respect to the third (about 355 nm) and fourth (about 266 nm) harmonics thereof.

Laser ablation may be effectively performed with such lasers using, for example, about 35 nanosecond pulses with a pulse energy of about 0.3 to about 1.0 J/cm$^2$ with excimer lasers, although these values may be varied as appropriate depending on the ablation required.

The hydrophobic laser ablatable graft copolymers of the invention may be formed into any article that will undergo laser ablation processing. The article will preferably comprise one or more layers, wherein each of the layers absorbs light output from a laser within the range of from about 210 nm to about 360 nm, and wherein at least one of the layers comprises the hydrophobic laser ablatable fluorine-containing graft copolymer.

Suitable articles include, for example, ink jet printheads in which the ink jet openings are formed by laser ablation, circuit chips in which vias therein are formed by laser ablation, and coated products such as coated wires/cables that are marked via laser ablation. The processing with the laser by ablation may either form a hole completely through the graft copolymer layer or may simply mark the surface thereof by partially removing a portion of the layer.

In a most preferred embodiment of the present invention, the hydrophobic graft copolymer is used as a coating upon an ink jet printhead nozzle plate in which the ink jet openings therein are to be formed via laser ablation by a laser outputting radiation in the wavelength range of from about 210 nm to about 360 nm. The nozzle plate comprises a substrate coated with the hydrophobic fluorine-containing graft copolymer.

A back surface of the nozzle plate may include conductive traces formed thereon using a conventional photolithographic etching and/or plating process. The conductive traces are terminated by large contact pads designed to interconnect with a printer. The print cartridge is designed to be installed in a printer so that the contact pads contact printer electrodes providing externally generated energization signals to the printhead.

The nozzle plate substrate may comprise a laser ablatable polymer, which may be, for example, polyimide, polymethylmethacrylate, polycarbonate, polyester, polyamide, polyethylene-terephthalate or mixtures thereof. Preferably, the substrate comprises a polyimide such as KAPTON™ or UPILEX™. The hydrophobic laser ablatable fluorine-containing graft copolymer material of the invention is preferably coated upon a surface of the nozzle plate prior to laser ablation. This permits the openings to be formed in the nozzle plate by laser ablation to be cleanly formed without the fear of any post-formation clogging or alteration due to coating the nozzle plate face after formation of the openings.

To promote adhesion between the nozzle plate surface and the hydrophobic laser ablatable fluorine-containing graft copolymer, well known adhesion promoters or grafting agents may optionally be included within the graft copolymer material. Still further, a separate laser ablatable adhesive layer may be included between the nozzle plate face and the hydrophobic graft copolymer.

In a preferred process, the coated nozzle plate is placed in a laser processing chamber and laser-ablated in a desired pattern, which may be defined by one or more masks, using laser radiation, such as that generated by an excimer laser.

The printhead of the present invention can be of any suitable configuration without restriction. The ink jet printhead preferably comprises a plurality of channels, wherein the channels are capable of being filled with ink from an ink supply and wherein the channels terminate in nozzles on one surface of the printhead, the surface of which is coated with the hydrophobic laser ablatable fluorine-containing graft copolymer as discussed above. Suitable ink jet printhead designs are described in, for example, U.S. Pat. No. 5,291,226, as well as in U.S. Pat. No. 5,218,381 and U.S. Pat. No. 5,212,496, all incorporated herein by reference in their entireties. Further explanation of the ink jet printhead and the remaining well known components and operation thereof is accordingly not undertaken again in the present application.

Although the invention has been described with reference to specific preferred embodiments, it is not intended to be limited thereto, rather those having ordinary skill in the art will recognize that variations and modifications may be made therein which are within the spirit of the invention and within the scope of the claims.

What is claimed is:

1. A method of making a laser ablated article, comprising
forming an article of one or more layers, wherein each of the layers absorbs radiation within the wavelength range of from about 210 nm to about 360 nm, wherein at least one of the layers comprises a hydrophobic fluorine-containing graft copolymer derived from at least one fluorine-containing monomer selected from the group consisting of tetrafluoroethylene, perfluoro (vinyl ether) and hexafluoropropylene and at least one comonomer containing at least one aromatic group and having a structure

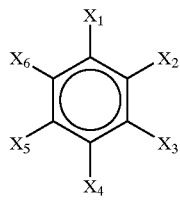

wherein each of $X_1$, $X_2$, $X_3$, $X_4$, $X_5$ and $X_6$ are the same or different and are selected from the group consisting of H, an alkyl group having from 1 to 20 carbon atoms and an aryl group having from 6 to 18 carbon atoms and wherein at least one of $X_1$, $X_2$, $X_3$, $X_4$, $X_5$ and $X_6$ is not H, and wherein the comonomer is present in an amount of about 0.5% to about 20.0% based on the weight of the comonomer and the fluorine-containing monomer, and processing the article with a laser that outputs radiation at a wavelength of between about 210 nm and about 360 nm.

2. The method according to claim 1, wherein the laser is an excimer laser or an NdYAG laser.

3. The method according to claim 2, wherein the excimer laser is a krypton fluoride excimer laser that outputs radiation at a wavelength of about 248 nm, an argon chloride excimer laser that outputs radiation at a wavelength of about 308 nm, or a xenon fluoride excimer laser that outputs radiation at a wavelength of about 351 nm.

4. The method according to claim 3, wherein the excimer laser is a krypton fluoride excimer laser that outputs radiation at a wavelength of about 248 nm.

5. The method according to claim 1, wherein the article is an ink jet nozzle printhead nozzle plate comprised of a substrate coated with the hydrophobic fluorine-containing graft copolymer.

6. The method according to claim 5, wherein the processing comprises forming ink jet openings in the nozzle plate.

7. The method according to claim 1, wherein the at least one fluorine-containing monomer is tetrafluoroethylene and the at least one comonomer containing at least one aromatic group is styrene.

8. A laser ablated article comprising one or more layers, wherein each of the layers absorbs radiation from a laser within the wavelength range of from about 210 nm to about 360 nm, wherein at least one of the layers comprises a hydrophobic fluorine-containing graft copolymer derived from at least one fluorine-containing monomer selected from the group consisting of tetrafluoroethylene, perfluoro (vinyl ether) and hexafluoropropylene and at least one comonomer containing at least one aromatic group and having a structure

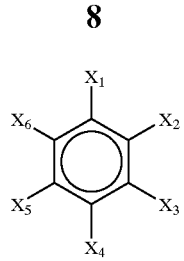

wherein each of $X_1$, $X_2$, $X_3$, $X_4$, $X_5$ and $X_6$ are the same or different and are selected from the group consisting of H, an alkyl group having from 1 to 20 carbon atoms and an aryl group having from 6 to 18 carbon atoms and wherein at least one of $X_1$, $X_2$, $X_3$, $X_4$, $X_5$ and $X_6$ is not H, and wherein the comonomer is present in an amount of about 0.5% to about 20.0% based on the weight of the comonomer and the fluorine-containing monomer.

9. The laser ablated article according to claim 8, wherein the at least one fluorine-containing monomer is tetrafluoroethylene and the at least one comonomer containing at least one aromatic group is styrene.

10. The laser ablated article according to claim 8, wherein the laser ablatable hydrophobic coating is laser ablatable with a krypton fluoride excimer laser at a wavelength of about 248 nm, an argon chloride excimer laser at a wavelength of about 308 nm, a xenon fluoride excimer laser at a wavelength of about 351 nm, the third harmonic of an NdYAG laser at a wavelength of about 355 nm, or the fourth harmonic of an NdYAG laser at a wavelength of about 266 nm.

11. The laser ablated article according to claim 8, wherein the article is a nozzle face plate of an ink jet printhead.

12. The laser ablated article according to claim 8, wherein the comonomer is present in an amount of about 1.0% to about 5.0% based on the weight of the comonomer and the fluorine-containing monomer.

13. An ink jet printhead comprising a nozzle plate, wherein the nozzle plate contains ink jet openings and comprises a polymer substrate coated with a laser ablatable hydrophobic coating comprised of a hydrophobic fluorine-containing graft copolymer derived from at least one fluorine-containing monomer selected from the group consisting of tetrafluoroethylene, perfluoro (vinyl ether) and hexafluoropropylene and at least one comonomer containing at least one aromatic group and having a structure

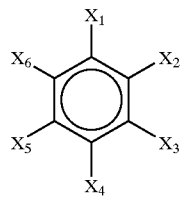

wherein each of $X_1$, $X_2$, $X_3$, $X_4$, $X_5$ and $X_6$ are the same or different and are selected from the group consisting of H, an alkyl group having from 1 to 20 carbon atoms and an aryl group having from 6 to 18 carbon atoms and wherein at least one of $X_1$, $X_2$, $X_3$, $X_4$, $X_5$ and $X_6$ is not H, wherein the comonomer is present in an amount of about 0.5% to about 20.0% based on the weight of the comonomer and the fluorine-containing monomer, and wherein the laser ablatable hydrophobic coating is laser ablatable within the wavelength range of from about 210 nm to about 360 nm.

14. The ink jet printhead according to claim 13, wherein the at least one fluorine-containing monomer is tetrafluoroethylene and the at least one comonomer containing at least one aromatic group is styrene.

15. The ink jet printhead according to claim 13, wherein the laser ablatable hydrophobic coating is laser ablatable with a krypton fluoride excimer laser at a wavelength of about 248 nm, an argon chloride excimer laser at a wavelength of about 308 nm, a xenon fluoride excimer laser at a wavelength of about 351 nm, the third harmonic of an NdYAG laser at a wavelength of about 355 nm, or the fourth harmonic of an NdYAG laser at a wavelength of about 266 nm.

16. The ink jet printhead according to claim 13, wherein the comonomer is present in an amount of about 1.0% to about 5.0% based on the weight of the comonomer and the fluorine-containing monomer.

17. A laser ablated article comprising one or more layers, wherein each of the layers absorbs radiation from a laser within the wavelength range of from about 210 nm to about 360 nm, and wherein at least one of the layers (1) comprises a hydrophobic fluorine-containing graft copolymer derived from at least one fluorine-containing monomer selected from the group consisting of tetrafluoroethylene, perfluoro(vinyl ether) and hexafluoropropylene and at least one comonomer containing at least one aromatic group and having a structure

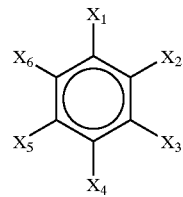

wherein each of $X_1$, $X_2$, $X_3$, $X_4$, $X_5$ and $X_6$ are the same or different and are selected from the group consisting of H, an alkyl group having from 1 to 20 carbon atoms and an aryl group having from 6 to 18 carbon atoms and wherein at least one of $X_1$, $X_2$, $X_3$, $X_4$, $X_5$ and $X_6$ is not H, and (2) contains at least one of laser ablated surface marks or laser ablated holes therein.

* * * * *